US010135838B2

(12) United States Patent
Yang et al.

(10) Patent No.: US 10,135,838 B2
(45) Date of Patent: Nov. 20, 2018

(54) METHOD AND SYSTEM OF NETWORK CONNECTION CONTROL FOR MOBILE TERMINALS (71) Applicant: HUIZHOU TCL MOBILE COMMUNICATION CO., LTD., Huizhou, Guangdong (CN)

(72) Inventors: Weiqin Yang, Huizhou (CN); Bin Yu, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 227 days.

(21) Appl. No.: 14/909,294

(22) PCT Filed: Jul. 30, 2015

(86) PCT No.: PCT/CN2015/085511
§ 371 (c)(1),
(2) Date: Feb. 1, 2016

(87) PCT Pub. No.: WO2016/141667
PCT Pub. Date: Sep. 15, 2016

(65) Prior Publication Data
US 2017/0041325 A1 Feb. 9, 2017

(30) Foreign Application Priority Data
Mar. 12, 2015 (CN) .......................... 2015 1 0108112

(51) Int. Cl.
G06F 17/00 (2006.01)
H04L 29/06 (2006.01)
(Continued)

(52) U.S. Cl.
CPC ............ H04L 63/105 (2013.01); H04L 63/20 (2013.01); H04W 12/08 (2013.01); H04W 48/20 (2013.01); H04W 88/08 (2013.01)

(58) Field of Classification Search
None
See application file for complete search history.

(56) References Cited

U.S. PATENT DOCUMENTS 7,308,703 B2 * 12/2007 Wright .................... G06F 21/32
380/258
8,606,911 B2 * 12/2013 Raleigh ................... H04L 12/14
709/224

(Continued)

FOREIGN PATENT DOCUMENTS

CN 102573107 A 7/2012
CN 103561404 A 4/2014
(Continued)

Primary Examiner — Kambiz Zand
Assistant Examiner — Arezoo Sherkat
(74) Attorney, Agent, or Firm — Ladas & Parry LLP (57) ABSTRACT A method of network connection control for mobile terminals, includes: classifying network access points accessible to a mobile terminal according to their security levels, and applications of the mobile terminal according to the security level of the networks that the applications are allowed to connect to; setting applications of different security level to connect to the network through access points at corresponding security levels; setting the security level of each network access point and application of the mobile terminal; and searching the security level of the application and the security levels of the network access points that the application is allowed to connect to.

6 Claims, 2 Drawing Sheets (51) Int. Cl.
*H04W 12/08* (2009.01)
*H04W 48/20* (2009.01)
*H04W 88/08* (2009.01)

(56) References Cited

U.S. PATENT DOCUMENTS

| | | | | |
|---|---|---|---|---|
| 8,782,637 | B2* | 7/2014 | Khalid | G06F 8/61 |
| | | | | 718/1 |
| 8,799,634 | B2* | 8/2014 | Courtney | G06F 21/53 |
| | | | | 713/1 |
| 9,107,143 | B2* | 8/2015 | Kim | H04L 63/104 |
| 9,183,409 | B2 | 11/2015 | Son | |
| 9,253,663 | B2* | 2/2016 | Raleigh | H04W 24/02 |
| 9,432,361 | B2* | 8/2016 | Mahaffey | H04L 63/0853 |
| 9,521,122 | B2* | 12/2016 | Abuelsaad | H04W 12/02 |
| 9,723,003 | B1* | 8/2017 | McClintock | H04L 63/10 |
| 9,763,097 | B2* | 9/2017 | Robinson | H04W 12/08 |
| 10,015,151 | B2* | 7/2018 | Liu | H04W 12/06 |
| 10,063,592 | B1* | 8/2018 | McClintock | H04L 63/20 |
| 2006/0264227 | A1* | 11/2006 | Takahashi | H04L 41/0806 |
| | | | | 455/513 |
| 2012/0137369 | A1* | 5/2012 | Shin | G06F 21/57 |
| | | | | 726/25 |
| 2012/0317609 | A1* | 12/2012 | Carrara | G06F 21/6218 |
| | | | | 726/1 |
| 2013/0067535 | A1 | 3/2013 | Kang et al. | |
| 2014/0032691 | A1* | 1/2014 | Barton | H04L 41/00 |
| | | | | 709/206 |
| 2014/0094159 | A1* | 4/2014 | Raleigh | H04W 24/02 |
| | | | | 455/418 |
| 2015/0188949 | A1* | 7/2015 | Mahaffey | H04L 63/20 |
| | | | | 726/1 |
| 2015/0324593 | A1* | 11/2015 | Abuelsaad | H04W 12/02 |
| | | | | 713/152 |
| 2016/0253651 | A1* | 9/2016 | Park | G06F 3/0482 |
| | | | | 705/39 |
| 2016/0337863 | A1* | 11/2016 | Robinson | H04W 12/08 |

FOREIGN PATENT DOCUMENTS

CN 104717653 A 6/2015
EP 2814286 A1 5/2014

* cited by examiner

METHOD AND SYSTEM OF NETWORK CONNECTION CONTROL FOR MOBILE TERMINALS

CROSS REFERENCE TO RELATED APPLICATION

This application claims the priority of International Application No. PCT/CN2015/085511, filed on Jul. 30, 2015, which claims priority to Chinese Application No. 201510108112.3, filed on Mar. 12, 2015. The entire disclosures of each of the above applications are incorporated herein by reference.

BACKGROUND OF THE INVENTION

1. Field of the Invention

The present invention relates to mobile terminal technology, and more specifically, to a method and system of network connection control for mobile terminals.

2. Description of the Prior Art

As mobile communication technology advances and people's living standard continues to be elevated, the use of various mobile terminals, such as mobile phone, becomes more and more prevalent. Mobile phone has become an indispensable communication tool in our daily life.

Existing technology enables mobile phones to provide more and more functions. Currently, mobile terminals are commonly used for functions that were previously served by computers, such as internet surfing, mobile payment, and email sending and receiving. Comparing with computers, the location of mobile terminals changes constantly, meaning that the network access point of mobile terminals changes constantly as well. For example, at first, a mobile terminal is manually connected to a safe network access point AP1 through WIFI. Later, the mobile phone is no longer able to receive AP1's signal due to location changes, therefore it connects to another access point AP2 through WIFI. Another example is that the mobile phone, at first, is manually connected to a safe access point AP1. Later, due to a breakdown of AP1, the mobile terminal connects to another WIFI access point AP2. In these two examples, users first connect to a safe network access point AP1, but later, due to various reasons, the mobile terminal automatically connects to network access point AP2. If AP2 is inferior in terms of security, it is inconvenient for users as their network security is threatened.

Therefore, the current technology has room for improvement and development.

SUMMARY OF THE INVENTION

An object of the present invention is to solve the technical problem with mobile terminals: due to location changes of mobile terminals, network access point breakdown, or location changes of network access points, mobile terminals might automatically connect to access points and thus are exposed to network security risks. The present invention provides a method and system of safe and reliable network connection control for mobile terminals. It improves connection security when applications connect to the network and provides convenience to users.

According to the present invention, a method of network connection control for mobile terminals comprises:

classifying network access points accessible to a mobile terminal according to their security levels, from high to low, and classifying applications of the mobile terminal according to application security levels that indicate which security levels of the networks the applications are allowed to access to;

setting, according to operation commands from a user, the applications of different application security levels to connect to the network through access points at corresponding security levels;

setting, according to operation commands from the user, the security levels of the network access points and the application security levels of the applications, and saving them into a designated document;

reminding, in response to a detection of a newly installed application, of setting an application security level of the newly installed application;

getting a list of presently opened applications when one of the applications is opened or closed, or an network access point changes;

searching the designated document which saves the application security levels of the applications to get the highest application security level of the applications in the list of presently opened applications;

searching the designated document which saves the security levels of the network access points to get the security level of a current network access point; and reminding the user that the security level of the current network access point is not appropriate for the highest application security level of the presently opened applications if the security level of the current network access point does not conform to the highest application security level of the presently opened applications.

In one aspect of the present invention, steps of classifying network access points accessible to a mobile terminal according to their security levels, from high to low, and classifying applications of the mobile terminal according to application security levels that indicate which security levels of the networks the applications are allowed to access to, comprise:

classifying the network access points according to three access point security levels, from high to low: a first access point security level, a second access point security level and a third access point security level;

classifying the applications of the mobile terminal according to three application security levels, from high to low: a first application security level, a second application security level, and a third application security level.

In another aspect of the present invention, steps of setting, according to operation commands from a user, the applications of different application security levels to connect to the network through access points at corresponding security levels, comprise:

setting applications of the first application security level to connect to the network only through access points at the first access point security level;

setting applications of the second application security level to connect to the network through access points at the first or second access point security levels;

setting applications of the third application security level to connect to the network only through access points at the first, second and third access point security levels.

In still another aspect of the present invention, steps of reminding, in response to a detection of a newly installed application, of setting an application security level of the newly installed application, further comprise:

setting the security level to a default security level if no setting is done.

In yet another aspect of the present invention, steps of reminding the user that the security level of the current network access point is not appropriate for the highest application security level of the presently opened applications if the security level of the current network access point does not conform to the highest application security level of the presently opened applications, comprise:

connecting to the network only through access points at the first access point security level if the highest application security level of the presently opened applications is the first application security level;

connecting to the network through access points at the first and second access point security level if the highest application security level of the presently opened applications is the second application security level;

connecting to the network only through access points at the first, second and third access point security level if the highest application security level of the presently opened applications is the third application security level;

reminding users that the security level of the current access point is not appropriate for the highest application security level of the presently opened applications.

According to the present invention, a method of network connection control for mobile terminals comprises:

classifying network access points accessible to a mobile terminal according to their security levels, from high to low, and classifying applications of the mobile terminal according to application security levels that indicate which security levels of the networks the applications are allowed to access to;

setting, according to operation commands from a user, the applications of different application security levels to connect to the network through access points at corresponding security levels;

setting, according to operation commands from the user, the security levels of the network access points and the application security levels of the applications, and saving them into a designated document;

when one of the applications is opened and needs to connect to the network through the network access point, searching the application security level of the application and the security levels of the network access points that the application is allowed to connect to so to control the network connection of the application.

In one aspect of the present invention, steps of classifying network access points accessible to a mobile terminal according to their security levels, from high to low, and classifying applications of the mobile terminal according to application security levels that indicate which security levels of the networks the applications are allowed to access to, comprise:

classifying the network access points according to three access point security levels, from high to low: a first access point security level, a second access point security level and a third access point security level;

classifying the applications of the mobile terminal according to three application security levels, from high to low: a first application security level, a second application security level, and a third application security level.

In another aspect of the present invention, steps of setting, according to operation commands from a user, the applications of different application security levels to connect to the network through access points at corresponding security levels, comprise:

setting applications of the first application security level to connect to the network only through access points at the first access point security level;

setting applications of the second application security level to connect to the network through access points at the first or second access point security levels;

setting applications of the third application security level to connect to the network only through access points at the first, second and third access point security levels.

In another aspect of the present invention, steps of setting, according to operation commands from the user, the security levels of the network access points and the application security levels of the applications, and saving them into a designated document, comprise:

reminding, in response to a detection of a newly installed application, of setting an application security level of the newly installed application; setting the security level to a default security level if no setting is done.

In still another aspect of the present invention, steps of searching the application security level of the application and the security levels of the network access points that the application is allowed to connect to so to control the network connection of the application, comprise:

getting a list of presently opened applications when one of the applications is opened or closed, or an network access point changes;

searching the designated document which saves the application security levels of the applications to get the highest application security level of the applications in the list of presently opened applications;

searching the designated document which saves the security levels of the network access points to get the security level of a current network access point; and reminding the user that the security level of the current network access point is not appropriate for the highest application security level of the presently opened applications if the security level of the current network access point does not conform to the highest application security level of the presently opened applications.

In yet another aspect of the present invention, steps of reminding the user that the security level of the current network access point is not appropriate for the highest application security level of the presently opened applications if the security level of the current network access point does not conform to the highest application security level of the presently opened applications, comprise:

connecting to the network only through access points at the first access point security level if the highest application security level of the presently opened applications is the first application security level;

connecting to the network through access points at the first and second access point security level if the highest application security level of the presently opened applications is the second application security level;

connecting to the network only through access points at the first, second and third access point security level if the highest application security level of the presently opened applications is the third application security level;

reminding users that the security level of the current access point is not appropriate for the highest application security level of the presently opened applications.

According to the present invention, a system of network connection control for mobile terminals comprises:

a first setting module, for classifying network access points accessible to a mobile terminal according to their security levels, from high to low, and classifying applications of the mobile terminal according to application security levels that indicate which security levels of the networks the applications are allowed to access to;

a second setting module, for setting, according to operation commands from a user, the applications of different application security levels to connect to the network through access points at corresponding security levels;

a third setting module, for setting, according to operation commands from the user, the security levels of the network access points and the application security levels of the applications, and saving them into a designated document; and a connection control module, when one of the applications is opened and needs to connect to the network through the network access point, the connection control module for searching the application security level of the application and the security levels of the network access points that the application is allowed to connect to so to control the network connection of the application.

In one aspect of the present invention, the first setting module comprises:

a first classifying unit, for classifying the network access points according to three access point security levels, from high to low: a first access point security level, a second access point security level and a third access point security level;

a second classifying unit, for classifying the applications of the mobile terminal according to three application security levels, from high to low: a first application security level, a second application security level, and a third application security level. The second setting module comprises:

a setting unit, for setting applications of the first application security level to connect to the network only through access points at the first access point security level, for setting applications of the second application security level to connect to the network through access points at the first or second access point security levels, and for setting applications of the third application security level to connect to the network only through access points at the first, second and third access point security levels.

In still another aspect of the present invention, the third setting module comprises:

a setting saving unit, for setting, according to operation commands from the user, the security levels of the network access points and the application security levels of the applications, and saving them into a designated document;

a detection reminding unit, for reminding, in response to a detection of a newly installed application, of setting an application security level of the newly installed application and for setting the security level to a default security level if no setting is done.

In yet another aspect of the present invention, the connection control module comprises:

a first getting unit, for getting a list of presently opened applications when one of the applications is opened or closed, or an network access point changes;

a second getting unit, for searching the designated document which saves the application security levels of the applications to get the highest application security level of the applications in the list of presently opened applications;

a third getting unit, for searching the designated document which saves the security levels of the network access points to get the security level of a current network access point; and a connection control unit, for reminding the user that the security level of the current network access point is not appropriate for the highest application security level of the presently opened applications if the security level of the current network access point does not conform to the highest application security level of the presently opened applications.

The method and system of network connection control for mobile terminals provided by the present invention adds a new function to mobile terminals: they can control network connection according to the current network security status. It elevates the security when applications connect to the network and provides convenience to users.

DETAILED DESCRIPTION OF THE PREFERRED EMBODIMENTS

The present invention provides a method for deleting messages and a terminal which mainly applies message deleting path when the screen is locked. The method can also apply when the phone is being used. When a message prompt box pops up on the screen of terminals, if users' sliding path on the screen is in line with the pre-defined deleting path, the message is deleted directly. In order to illustrate the technique and effects of the present invention, a detailed description will be disclosed by the following disclosure in conjunction with figures. It is noted that the same components are labeled by the same number.

Figure 1:
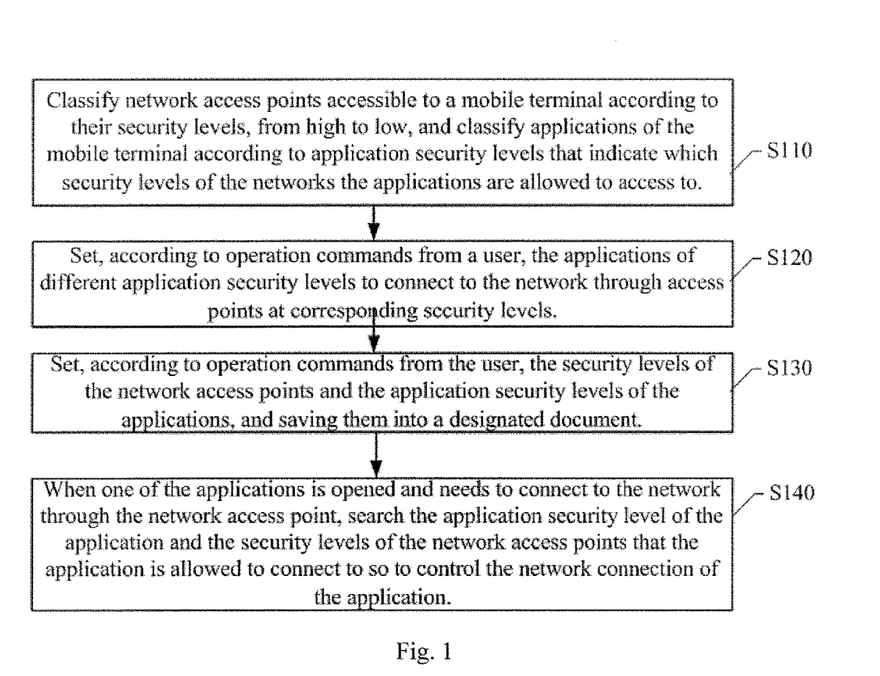
FIG. 1 is a flow chart of a method of network connection control according to a preferred embodiment of the present invention.

Please refer to FIG. 1. FIG. 1 is a flow chart of a method of network connection control of a preferred embodiment of the present invention. According to the present embodiment, the method of network connection control for mobile terminals comprises:

Step S110: classifying network access points accessible to a mobile terminal according to their security levels, from high to low, and classifying applications of the mobile terminal according to application security levels that indicate which security levels of the networks the applications are allowed to access to.

For example, network access points accessible to the mobile terminal can be classified into three levels according to their security level, from high to low: a first access point security level, a second access point security level, and a third access point security level. Network access points that are deemed as at the first access point security level provide the highest level of security, network access points that are deemed as at the second access point security level provide the second highest level of security, and network access points that are deemed as at the third access point security level provide the lowest level of security.

Meanwhile, classify applications of the mobile terminals into three security levels as well: the first application security level, the second application security level, and the third application security level. Applications that are deemed as at the first application security level require access points that are at the highest security level, applications that are deemed as at the second application security level require access points that are at the second highest security level, and applications that are deemed as at the third application security level require access points that are at lower security level. In other words, according to the security level of the network that applications are allowed to connect to, applications of the mobile terminal can be classified into three security levels, from high to low: the first application security level, the second application security level, and the third application security level.

Step S120: setting, according to operation commands from a user, the applications of different application security levels to connect to the network through access points at corresponding security levels.

For example, applications at the first application security level are set to connect to the network only through access points that are at the first access point security level. Applications at the second application security level are set to connect to the network through access points that are at the first or second access point security levels. Applications at the third application security level are set to connect the network only through access points that are at the first, second or third access point security levels.

Step S130: setting, according to operation commands from the user, the security levels of the network access points and the application security levels of the applications, and saving them into a designated document.

In the present preferred embodiment, the security level of each network access point and application can be set by users themselves. Preferably, set data service of the mobile terminal and the AP of a user's household as at the first access point security level, APs at the office and family's and friends' households as at the second access point security level, and other APs as at the third access point security level. Set applications that require higher security, including network payment and email services, and those that users did not designate a security level (default application security level) as at the first application security level, applications that require standard security, such as real-time chatting, as at the second application security level, and all the other applications as at the third application security level.

The method of network connection control for mobile terminals of step S130 further comprises:

When a new application is installed and detected, reminding users to set the security level of the newly installed application. If users do not set the security level, the default security level will be applied.

When the mobile terminal detects that a new application is installed, it reminds users to set the application's security level. If users do not set the security level, the mobile terminal defaults the application's security level as the first application security level. More specifically, a document in the mobile terminal records the security level of each application. The following text is an example of such document (hereinafter referred to as "application security level list"):

Name of the application: security level
WeChat: second application security level
Alipay purse: first application security level
Email: second application security level
Browser: third application security level When a new application is installed, one more line will be added to the application security level list to describe the security level of the application. Users of the mobile terminal change the security level of each application in the setting menu. When the change is done, the application security level list will be updated accordingly. In addition, when the application is uninstalled, the line corresponding to the application in the application security level list will also be deleted.

In the present embodiment, a document in the mobile terminal records the security level of each network access point. The following text is an example of such document (hereinafter refers to as "access point security level list"):

Name or physical address of the access point: security level
Mobile business data service: first access point security level
1A-2B-33-4C-5C-B6: first access point security level
AA-22-56-02-EA-F2: third access point security level
39-0E-BA-73-82-6A: second access point security level The access point security level list will only add new content and not deleting old ones. As long as the mobile terminal finds a new network access point, it will write the physical address or name, and the security level of the access point into the list. Preferably, given that different access points might have the same name, it is more appropriate to record the physical address of the access point. In addition, users can change the security level of each access point in the setting menu. When the change is done, the access point security level list will also be updated accordingly.

Step S140: when one of the applications is opened and needs to connect to the network through the network access point, searching the application security level of the application and the security levels of the network access points that the application is allowed to connect to so to control the network connection of the application.

For example, when an application is opened or closed, or an network access point changes, get a list of presently opened applications. Then search for the security level of each application in the list of presently opened applications and get the highest application security level (the first application security level is higher than the second application security level, and the second application security level is higher than the third application security level). Get the current network access point, and search for the security level of the current network access point in the access point security level list. If the security level of the current access point does not conform to the highest application security level of the presently opened applications, users are reminded that the current network access point is not appropriate for the presently opened application to connect to the network. In other words, remind users that the security level of the current access point is not appropriate for the highest application security level of the presently opened applications.

More specifically, scenarios in which a current access point is not appropriate for the highest application security level of the presently opened applications comprise:

The highest application security level of the presently opened applications is the first application security level, hence the applications can only connect to the network through an access point at the first access point security level.

The highest application security level of the presently opened applications is the second application security level, hence the applications can connect to the network through an access point at the first or second access point security level.

The highest application security level of the presently opened applications is the third application security level, hence the applications can connect to the network through an access point at the first, second or third access point security level.

If the scenario is none of the above, users are reminded that the security level of the current access point does not conform to the highest application security level of the presently opened applications.

The following is a specific embodiment that provides detailed explanation of the method of the present invention.

Figure 2:
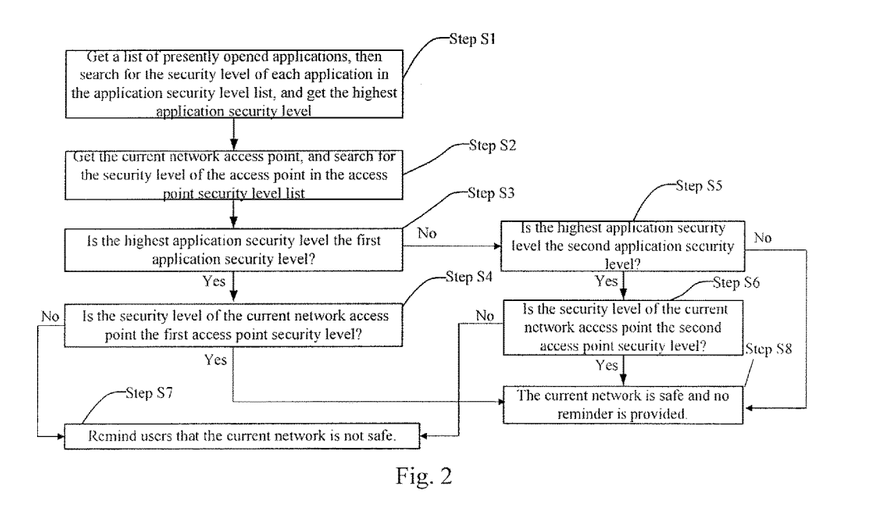
FIG. 2 illustrates a flow chart of a method of network connection control according to another preferred embodiment of the present invention.

As shown by FIG. 2, steps of the method of network connection control for mobile terminal of the present embodiment comprise:

Step S1: Get a list of presently opened applications, then search for the security level of each application in the application security level list. Get the highest application security level (the first application security level is higher than the second application security level, and the second application security level is higher than the third application security level).

Step S2: Get the current network access point, and search for the security level of the access point in the access point security level list.

Step S3: If the highest application security level got in step S1 is the first application security level, implement step S4, otherwise implement step S5.

Step S4: If the security level of the current network access point got in step S2 is the first access point security level, implement step S8, otherwise implement step S7.

Step S5: If the highest application security level got in step S1 is the second application security level, implement step S6, otherwise implement step S8.

Step S6: If the security level of the current network access point got in step S2 is the first or second access point security level, implement step S8, otherwise implement step S7.

Step S7: Remind users that the current network is not safe.

Step S8: The current network is safe and no reminder is provided.

The method of network connection control for mobile terminals provided by the present invention adds a new function to mobile terminals: they can control network connection according to the current network security status. It elevates the security when applications connect to the network and provides convenience to users.

Figure 3:
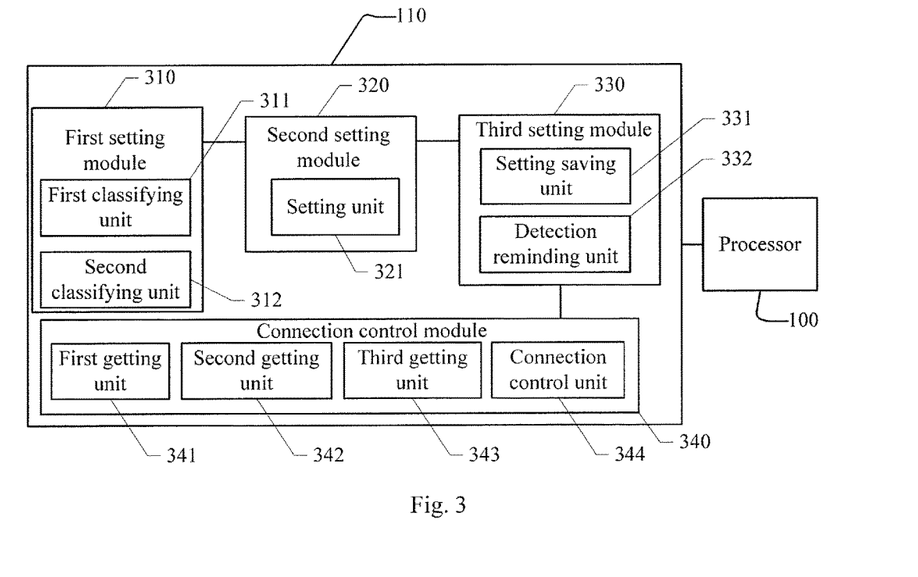
FIG. 3 is a block diagram of a system of network connection control according to a preferred embodiment of the present invention.

Based on the abovementioned embodiment, the present invention further provides a system of network connection control for mobile terminals. The system comprises a memory 110 and a processor 100. The memory 110 is used for storing instructions. The processor 100 is coupled to the memory 110, and is used to execute the instructions stored inside the memory 110. All of the modules 310, 320, 330, 340 and units 311, 312, 321, 331, 332, 341-344, as introduced below, are instructions executable by the processor 100 to perform corresponding functions. The system comprises:

a first setting module 310, for classifying network access points accessible to a mobile terminal according to their security levels, from high to low, and classifying applications of the mobile terminal according to application security levels that indicate which security levels of the networks the applications are allowed to access to;

a second setting module 320, for setting, according to operation commands from a user, the applications of different application security levels to connect to the network through access points at corresponding security levels;

a third setting module 330 for setting, according to operation commands from the user, the security levels of the network access points and the application security levels of the applications, and saving them into a designated document; and a connection control module 340, when one of the applications is opened and needs to connect to the network through the network access point, the connection control module for searching the application security level of the application and the security levels of the network access points that the application is allowed to connect to so to control the network connection of the application.

More specifically, the system of network connection control for mobile terminals has a first setting module 310. The first setting module 310 comprises:

a first classifying unit 311, for classifying the network access points according to three access point security levels, from high to low: a first access point security level, a second access point security level and a third access point security level;

a second classifying unit 312, for classifying the applications of the mobile terminal according to three application security levels, from high to low: a first application security level, a second application security level, and a third application security level.

Furthermore, the second setting module 320 comprises:

a setting unit 321, for setting applications of the first application security level to connect to the network only through access points at the first access point security level, for setting applications of the second application security level to connect to the network through access points at the first or second access point security levels, and for setting applications of the third application security level to connect to the network only through access points at the first, second and third access point security levels.

The third setting module 330 of the system of network connection control for mobile terminals comprises:

a setting saving unit 331, for setting, according to operation commands from the user, the security levels of the network access points and the application security levels of the applications, and saving them into a designated document; and a detection reminding unit 332, for reminding, in response to a detection of a newly installed application, of setting an application security level of the newly installed application and for setting the security level to a default security level if no setting is done.

The connection control module 340 of the system of network connection control for mobile terminals comprises:

a first getting unit 341, for getting a list of presently opened applications when one of the applications is opened or closed, or an network access point changes;

a second getting unit 342, for searching the designated document which saves the application security levels of the applications to get the highest application security level of the applications in the list of presently opened applications;

a third getting unit 343, for searching the designated document which saves the security levels of the network access points to get the security level of a current network access point; and a connection control unit 344, for reminding the user that the security level of the current network access point is not appropriate for the highest application security level of the presently opened applications if the security level of the current network access point does not conform to the highest application security level of the presently opened applications.

In sum, the method and system of network connection control for mobile terminals provided by the present invention adds a new function to mobile terminals: they can control network connection according to the current network security status. It elevates the security when applications connect to the network and provides convenience to users.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A method of network connection control for mobile terminals, comprising:
    classifying network access points accessible to a mobile terminal according to three access point security levels, from high to low: a first access point security level, a second access point security level and a third access point security level;
    classifying the applications of the mobile terminal according to three application security levels, from high to low: a first application security level, a second application security level, and a third application security level;
    setting applications of the first application security level to connect to the network only through access points at the first access point security level, wherein data service of the mobile terminal and an access point (AP) of a user's household is set as at the first access point security level, and network payment and email services are set as at the first application security level;
    setting applications of the second application security level to connect to the network through access points at the first or second access point security levels, wherein an AP at office or family's households is set as at the second access point security level, and real-time chatting is set as at the second application security level;
    setting applications of the third application security level to connect to the network only through access points at the first, second and third access point security levels, wherein other APs are set as at the third access point security level, and all the other applications as at the third application security level;
    setting, according to operation commands from the user, the security levels of the network access points and the application security levels of the applications, and saving them into a designated document;
    reminding, in response to a detection of a newly installed application, of setting an application security level of the newly installed application;
    getting a list of presently opened applications when one of the applications is opened or closed, or a network access point changes;
    searching the designated document which saves the application security levels of the applications to get the highest application security level of the applications in the list of presently opened applications;
    searching the designated document which saves the security levels of the network access points to get the security level of a current network access point; and
    reminding the user that the security level of the current network access point is not appropriate for the highest application security level of the presently opened applications if the security level of the current network access point does not conform to the highest application security level of the presently opened applications.

2. The method of claim 1, wherein steps of reminding, in response to a detection of a newly installed application, of setting an application security level of the newly installed application, further comprise:
    setting the security level to a default security level if no setting is done.

3. The method of claim 1, wherein steps of reminding the user that the security level of the current network access point is not appropriate for the highest application security level of the presently opened applications if the security level of the current network access point does not conform to the highest application security level of the presently opened applications, comprise:
    connecting to the network only through access points at the first access point security level if the highest application security level of the presently opened applications is the first application security level;
    connecting to the network through access points at the first and second access point security level if the highest application security level of the presently opened applications is the second application security level;
    connecting to the network only through access points at the first, second and third access point security level if the highest application security level of the presently opened applications is the third application security level;
    reminding users that the security level of the current access point is not appropriate for the highest application security level of the presently opened applications.

4. A method of network connection control for mobile terminals, comprising:
    classifying network access points accessible to a mobile terminal according to three access point security levels, from high to low: a first access point security level, a second access point security level and a third access point security level;
    classifying the applications of the mobile terminal according to three application security levels, from high to low: a first application security level, a second application security level, and a third application security level;
    setting applications of the first application security level to connect to the network only through access points at the first access point security level, wherein data service of the mobile terminal and an access point (AP) of a user's household is set as at the first access point security level, and network payment and email services are set as at the first application security level;
    setting applications of the second application security level to connect to the network through access points at the first or second access point security levels, wherein an AP at office or family's households is set as at the second access point security level, and real-time chatting is set as at the second application security level;
    setting applications of the third application security level to connect to the network only through access points at the first, second and third access point security levels, wherein other APs are set as at the third access point security level, and all the other applications as at the third application security level;
    setting, according to operation commands from the user, the security levels of the network access points and the application security levels of the applications, and saving them into a designated document;
    reminding, in response to a detection of a newly installed application, of setting an application security level of the newly installed application;
    when one of the applications is opened and needs to connect to the network through the network access point, searching the application security level of the application and the security levels of the network access points that the application is allowed to connect to so to control the network connection of the application, wherein steps of searching the application security level of the application and the security levels of the network access points that the application is allowed to connect to so to control the network connection of the application, comprise:

getting a list of presently opened applications when one of the applications is opened or closed, or a network access point changes;

searching the designated document which saves the application security levels of the applications to get the highest application security level of the applications in the list of presently opened applications;

searching the designated document which saves the security levels of the network access points to get the security level of a current network access point; and reminding the user that the security level of the current network access point is not appropriate for the highest application security level of the presently opened applications if the security level of the current network access point does not conform to the highest application security level of the presently opened applications.

5. The method of claim 4, wherein steps of setting, according to operation commands from the user, the security levels of the network access points and the application security levels of the applications, and saving them into a designated document, comprise:

reminding, in response to a detection of a newly installed application, of setting an application security level of the newly installed application; setting the security level to a default security level if no setting is done.

6. The method of claim 4, wherein steps of reminding the user that the security level of the current network access point is not appropriate for the highest application security level of the presently opened applications if the security level of the current network access point does not conform to the highest application security level of the presently opened applications, comprise:

connecting to the network only through access points at the first access point security level if the highest application security level of the presently opened applications is the first application security level;

connecting to the network through access points at the first and second access point security level if the highest application security level of the presently opened applications is the second application security level;

connecting to the network only through access points at the first, second and third access point security level if the highest application security level of the presently opened applications is the third application security level;

reminding users that the security level of the current access point is not appropriate for the highest application security level of the presently opened applications.

* * * * *